US009466002B2

(12) United States Patent
Winget

(10) Patent No.: US 9,466,002 B2
(45) Date of Patent: Oct. 11, 2016

(54) REAL-TIME SYSTEM FOR AIDING DRIVERS DURING VEHICLE BACKUP AND IMAGE CAPTURE AND TRANSMITTER UNIT FOR USE THEREIN

(75) Inventor: Norman M. Winget, Grand Blanc, MI (US)

(73) Assignee: Global IP Holdings, LLC, Sterling Heights, MI (US)

(*) Notice: Subject to any disclaimer, the term of this patent is extended or adjusted under 35 U.S.C. 154(b) by 1253 days.

(21) Appl. No.: 13/355,666

(22) Filed: Jan. 23, 2012

(65) Prior Publication Data

US 2013/0188050 A1    Jul. 25, 2013

(51) Int. Cl.
*H04N 7/18* (2006.01)
*G06K 9/00* (2006.01)
*G08G 1/16* (2006.01)

(52) U.S. Cl.
CPC ....... *G06K 9/00892* (2013.01); *G06K 9/00805* (2013.01); *G08G 1/167* (2013.01); *G08G 1/168* (2013.01); *H04N 7/183* (2013.01)

(58) Field of Classification Search
None
See application file for complete search history.

(56) References Cited

U.S. PATENT DOCUMENTS

| 6,995,687 | B2 | 2/2006 | Lang et al. | |
|---|---|---|---|---|
| 7,225,070 | B2 | 5/2007 | Li | |
| 2002/0170064 | A1* | 11/2002 | Monroe | H04N 7/181 725/105 |
| 2006/0259933 | A1* | 11/2006 | Fishel et al. | 725/105 |
| 2014/0226009 | A1* | 8/2014 | Lynam et al. | 348/148 |

* cited by examiner

*Primary Examiner* — Heather Jones
(74) *Attorney, Agent, or Firm* — Brooks Kushman P.C.

(57) ABSTRACT

A real-time surveillance system for aiding vehicle drivers and portable first unit for use therein is provided. The unit includes an image sensor that generates a sequence of images from received light. The system further includes a support to detachably support the unit on the vehicle so that the sensor is capable of receiving light from obstacles, hazards or individuals located in a blind spot region of the vehicle. A display is supported on the vehicle so that the images are viewable by a driver of the vehicle in real time. The system further includes a mechanism to authenticate a person desirous of using the system or removing the unit from the vehicle as an authorized person based, at least in part, on an authenticator. The authenticator includes at least one of a password, a passphrase, a personal identification number, a security token, a security card, and a biometric identifier.

19 Claims, 3 Drawing Sheets

REAL-TIME SYSTEM FOR AIDING DRIVERS DURING VEHICLE BACKUP AND IMAGE CAPTURE AND TRANSMITTER UNIT FOR USE THEREIN

TECHNICAL FIELD

This invention relates in general to real-time surveillance systems for aiding vehicle drivers and portable units for use therein.

BACKGROUND

A parking aid for motor vehicles is known to include a detector that can be mounted on the motor vehicle and an information provider in or on a driver's cab. The detector, which can be a radar, imaging or other electromagnetic, electro-optic or sonic device, includes a sensor and a control apparatus. Signals from the detector which advise of a situation in the blind spot of the motor vehicle can be transmitted to the information provider to inform the driver about a situation in the blind spot. If the detector is an image sensor, the information is available to the driver by a screen display or similar device.

In the above-noted system, the driver may be assisted during a backing up operation, for example, when parking in a manner to avoid running into an obstruction such as a parked motor vehicle or the like. The connection between the information provider and the detection equipment in such parking aids may be implemented wirelessly or by electrical wiring. There are disadvantages in regard to expense and labor installation time, especially when the parking aid is to be installed with electrical wiring in an existing vehicle. If the parking aid is to be used on a truck with a pulled trailer, a releasable connection must be provided between the information provider on the truck and the detection device on the back of the truck or trailer assembly in order to uncouple the pulled trailer.

U.S. Pat. No. 6,995,687 discloses a maneuvering or parking aid for a vehicle which has a detector and an information provider in wireless communication with each other. A signal of reverse driving occurring upon shifting to a reverse gear is transmitted to the detector from a backup light of the vehicle.

U.S. Pat. No. 7,225,070 discloses a parking guidance system for large vehicles which has a horizontal bar, a data collection assembly and a console unit. The horizontal bar is hollow and is mounted on a rear bumper of the vehicle, and houses the data collection assembly. The data collection assembly uses multiple ultrasonic transmitter and detector modules and an optional video camera module. A console unit mounted in a driver compartment receives data from the data collection assembly and processes the data to provide warnings to a user.

One problem associated with the prior art is that because the detector or detector unit is accessible to unauthorized individuals and is portable for use with multiple trailers, such units are susceptible to being tampered with or removed from the vehicle by unauthorized individuals.

SUMMARY

An object of at least one embodiment of the invention is to provide a real-time surveillance system for aiding vehicle drivers and a portable unit for use therein, wherein a person desirous of using the system or removing the unit from the vehicle must first be authenticated.

In carrying out the above object and other objects of the present invention, a real-time surveillance system for aiding vehicle drivers and portable first unit for use therein is provided. The portable first unit includes an image sensor that generates a sequence of images from received light. The portable first unit further includes a first controller and a transmitter controlled by the first controller to modulate a first carrier signal with the images and to transmit the modulated first carrier signal over a wireless communication channel. The system further includes a support to detachably support the first unit on the vehicle so that the image sensor is capable of receiving light from obstacles, hazards or individuals located in a blind spot region of the vehicle. The system still further includes a second unit. A second unit includes a second controller and a receiver to receive and demodulate the first carrier signal to obtain the images. A second unit still further includes a display controlled by the second controller to display the images. The display is supported on the vehicle so that the images are viewable by a driver of the vehicle in real time. The system further includes a means or apparatus for authenticating a person desirous of using the system or removing the first unit from the vehicle as an authorized person based, at least in part, on an authenticator. The authenticator includes at least one of a password, a passphrase, a personal identification number, a security token, a security card, and a biometric identifier.

The biometric identifier may include at least one of a fingerprint, a retinal pattern, an infrared vein pattern, a signature, a voice, a face, a bio-electric signal, and a DNA sequence.

The transmitter may form a part of the transceiver. A receiver part of the transceiver may be controlled by the first controller to demodulate a plurality of satellite carrier signals to obtain satellite position and time data, and to process the position and time data to obtain geographic position data which represents position of the first unit. The transceiver may be controlled by the first controller to modulate a second carrier signal with the geographic position data and to transmit the modulated second carrier signal over a wireless communication channel when a person removing the first unit is unauthorized to remove the first unit.

The support may detachably support the first unit to a rear of the vehicle.

The first unit may include means for electrically connecting the first unit with a wiring harness of the vehicle at the rear of the vehicle.

The first unit may include at least one battery to allow operation of the first unit after electrically disconnecting the first unit from the wiring harness.

The first unit may include at least one warning device selected from the group consisting of a proximity radar device, a Doppler radar device, a sonar device, an ultrasound device, an ultraviolet sensor, an infrared sensor, and a microwave sensor.

The transmitter may be controlled by the first controller to modulate the first carrier signal with a set of identification data. The set of identification data may uniquely identify the first unit. The receiver may demodulate the carrier signal to obtain the set of identification data. The second controller may determine whether the carrier signal was transmitted by the first unit based on the set of identification data.

The image sensor may be a video camera.

The first controller may be a microprocessor-based controller programmed to process the sequence of images to detect when the first unit is moving.

Further in carrying out the above object and other objects of the present invention, a real-time surveillance system for aiding drivers of vehicles having a cab and a trailer releasably connected to the cab is provided. The system includes a portable first unit having an image sensor that generates a sequence of images from received light. The system further includes a first controller and a transmitter controlled by the first controller to modulate a first carrier signal with the images and to transmit the modulated first carrier signal over a wireless communication channel. The system further includes a support to detachably support the first unit at the rear of the trailer so that the image sensor is capable of receiving light from obstacles, hazards or individuals located in a blind spot region behind the vehicle. A second unit of the system includes a second controller. A second unit further includes a receiver to receive and demodulate the first carrier signal to obtain the images. A second unit still further includes a display controlled by the second controller to display the images. The display is supported on the cab so that the images are viewable by a driver of the vehicle in real time. The system still further includes a means or apparatus for authenticating a person desirous of using the system or removing the first unit from the vehicle as an authorized person based, at least in part, on an authenticator. The authenticator includes at least one of a password, a passphrase, a personal identification number, a security token, a security card, and a biometric identifier.

The biometric identifier may include at least one of a fingerprint, a retinal pattern, an infrared vein pattern, a signature, a voice, a face, a bio-electric signal, and a DNA sequence.

The transmitter may form a part of transceiver. A receiver part of the transceiver may be controlled by the first controller to demodulate a plurality of satellite carrier signals to obtain satellite position and time data and to process the position and time data to obtain geographic position data which represents position of the first unit. The transceiver may be controlled by the first controller to modulate a second carrier signal with the geographic position data and to transmit the modulated second carrier signal over a wireless communication channel when a person removing the first unit is unauthorized to remove the first unit.

The first unit may include means for electrically connecting the first unit with a wiring harness of the trailer at the rear of the trailer.

The first unit may include at least one battery to allow operation of the first unit after electrically disconnecting the first unit from the wiring harness.

The first unit may include at least one warning device selected from the group consisting of a proximity radar device, a Doppler radar device, a sonar device, an ultrasound device, an ultraviolet sensor, an infrared sensor, and a microwave sensor.

The transmitter may be controlled by the first controller to modulate the first carrier signal with a set of identification data. The set of identification data may uniquely identify the first unit. The receiver may demodulate the carrier signal to obtain the set of identification data. The second controller may determine whether the carrier signal was transmitted by the first unit based on the set of identification data.

The image sensor may be a video camera.

The first controller may be a microprocessor-based controller programmed to process the sequence of images to detect when the first unit is moving.

Still further in carrying out the above object and other objects of the present invention, a portable unit for use in a real-time surveillance system for aiding vehicle drivers is provided. The unit includes an image sensor that generates a sequence of images from received light. The unit further includes a controller. The unit still further includes a transmitter controlled by the controller to modulate a carrier signal with the images and to transmit the modulated carrier signal over a wireless communication channel. The unit further includes a means or apparatus for authenticating a person desirous of using the system or removing the unit from the vehicle as an authorized person based, at least in part, on an authenticator. The authenticator includes at least one of a password, a passphrase, a personal identification number, a security token, a security card, and a biometric identifier.

The biometric identifier may include at least one of a fingerprint, a retinal pattern, an infrared vein pattern, a signature, a voice, a face, a bio-electric signal, and a DNA sequence.

The transmitter may form a part of transceiver. A receiver part of the transceiver may be controlled by the controller to demodulate a plurality of satellite carrier signals to obtain satellite position and time data, and to process the position and time data to obtain geographic position data which represents position of the first unit. The transceiver may be controlled by the controller to modulate a second carrier signal with the geographic position data and to transmit the modulated second carrier signal over a wireless communication channel when a person removing the first unit is unauthorized to remove the first unit.

The unit may include means for electrically connecting the unit with a wiring harness of the vehicle at the rear of the vehicle.

The unit may include at least one battery to allow operation of the unit after electrically disconnecting the unit from the wiring harness.

The unit may include at least one warning device selected from the group consisting of a proximity radar device, a Doppler radar device, a sonar device, an ultrasound device, an ultraviolet sensor, an infrared sensor, and a microwave sensor.

The transmitter may be controlled by the controller to modulate the carrier signal with a set of identification data. The set of identification data may uniquely identify the unit.

The image sensor may be a video camera.

The controller may be a microprocessor-based controller programmed to process the sequence of images to detect when the unit is moving.

The above object and other objects, features, and advantages of the present invention are readily apparent from the following detailed description of the best mode for carrying out the invention when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Generally, the present invention relates to the visual perception of potential obstacles, hazards or individuals which appear or are located in vehicle blindspots such as regions directly behind a vehicle while backing up. Such vehicles can include passenger cars, highway trucks, school buses, construction vehicles, delivery vehicles, and tractor-trailer rigs. While such surveillance systems are generally available, they are typically bolted to the vehicle and/or are hard-wired or wired in such a way to prevent their wide adaptation. At least one embodiment of the present invention utilizes a non-permanent, portable, battery-powered image capture and transmitter unit for use in a real-time system for aiding drivers during vehicle backup. Such a system and unit have a large potential to prevent accidents which happen during vehicle backup, thereby enhancing the safety of the vehicle, objects and pedestrians who are often distracted and unaware of potentially dangerous backup situations, as well as other vehicle operations.

Figure 1:
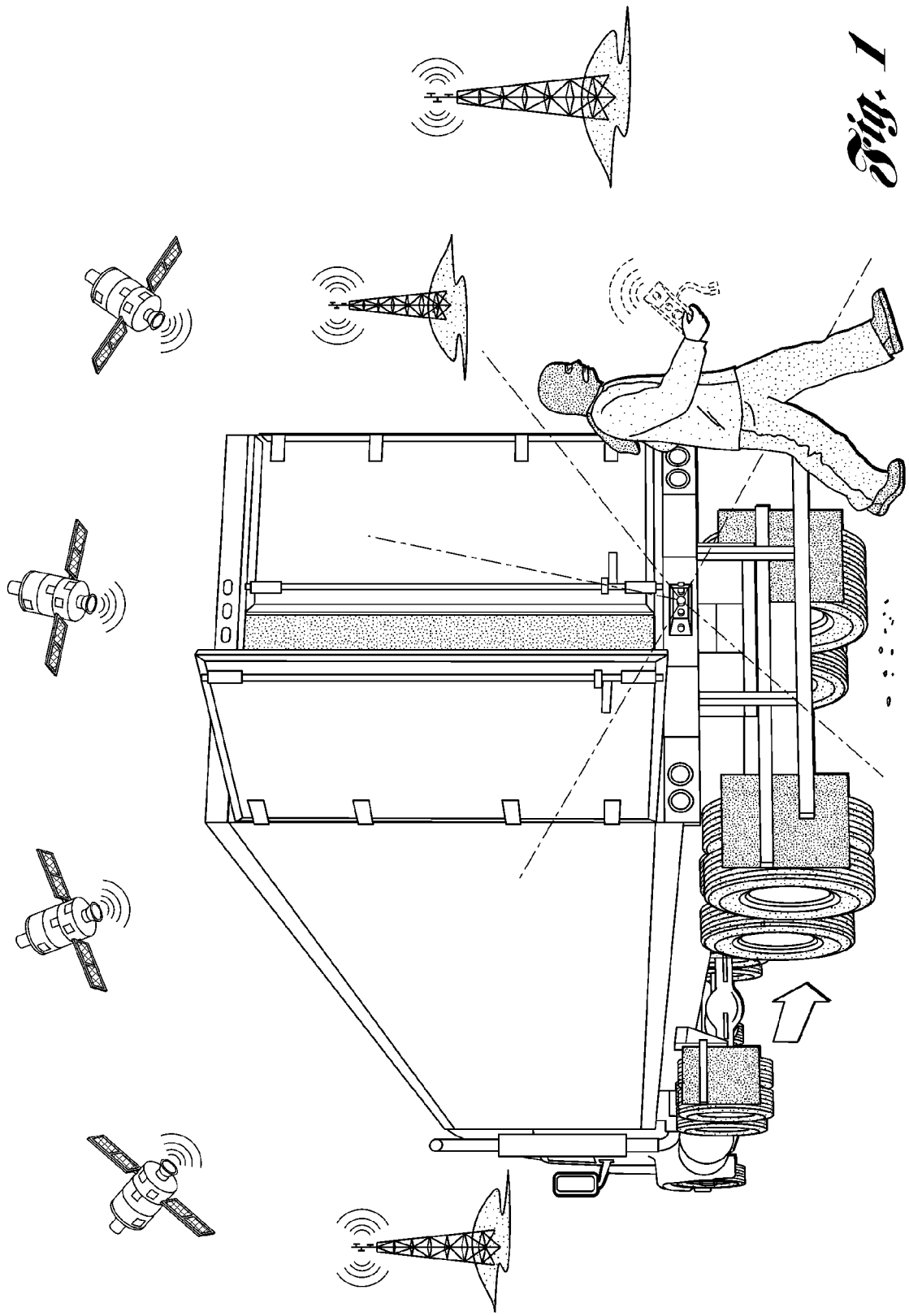
FIG. 1 is an environmental view of one embodiment of a real-time surveillance system for aiding vehicle drivers and a GPS-based portable unit for use therein being removed from the vehicle by an unauthorized individual who is carrying the unit which is illustrated in phantom.

FIG. 1 is an environmental view illustrating a vehicle having a tractor or cab and a trailer releasably connected to the cab, wherein the trailer is moving in a reverse direction, and wherein a distracted pedestrian or an unauthorized individual (such as a thief) cannot be viewed by a driver driving the vehicle even if equipped with typical rearview mirrors. A portable, battery-operated image capture and transmitter unit of a system of at least one embodiment of the invention, however, is supported or mounted in a detachable fashion at the rear of the trailer so that an image sensor or video camera of the unit is capable of receiving reflected light from the unauthorized individual or obstacle or hazard located in a region behind the trailer.

Figure 2:
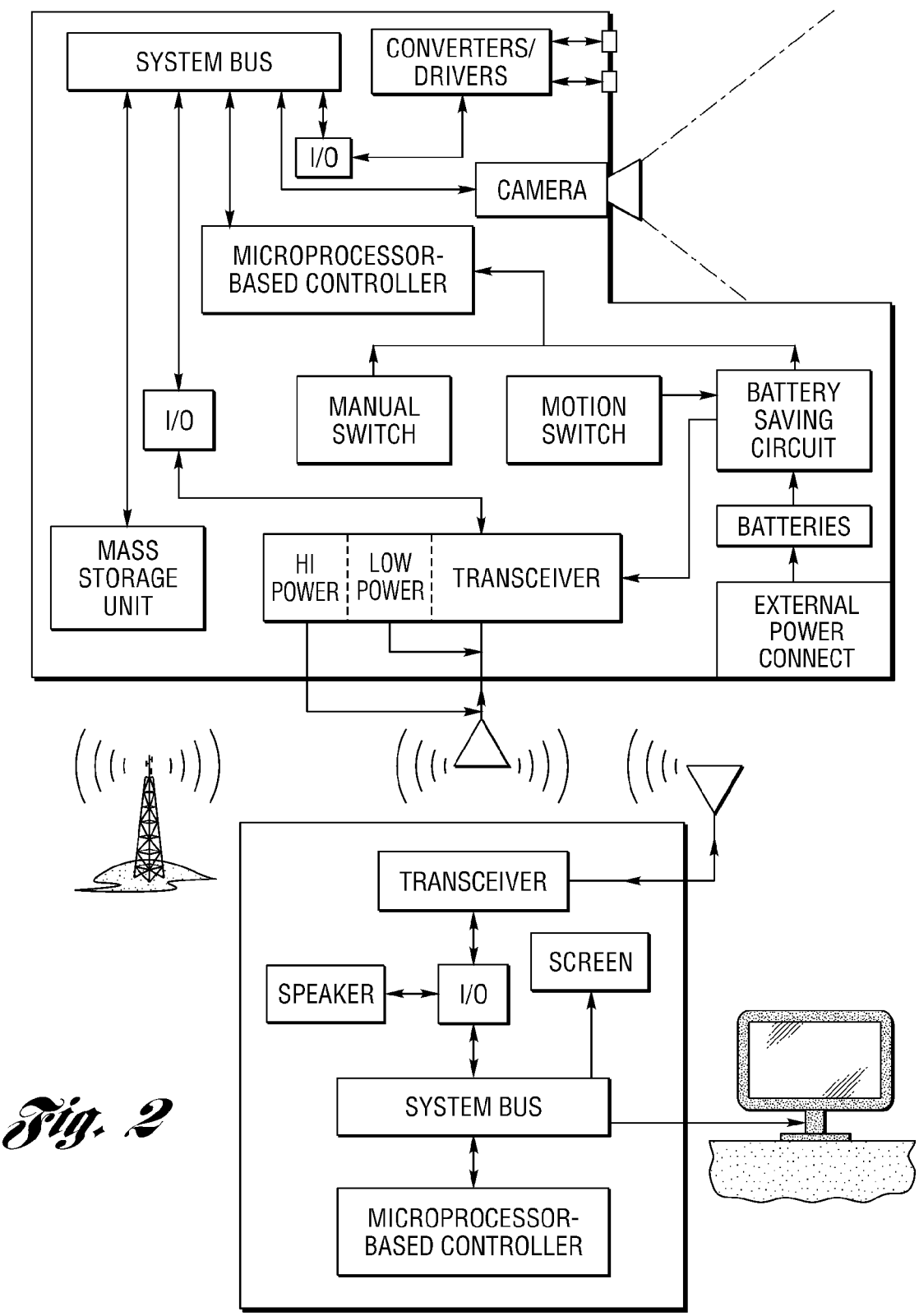
FIG. 2 is a schematic block diagram view of the embodiment of FIG. 1.

As shown in FIG. 2, the unit may include an external power connect to electrically connect the unit to the associated wiring harness of the trailer of the vehicle which may be terminated with a standard connector which allows the unit to be plugged into the existing vehicle wiring harness without modification. Alternatively, the wiring of the unit may be left unterminated and suitable for splicing into the vehicle wiring harness. The video camera, as also shown in FIG. 2, typically has a relatively wide field of view which includes that area or scene at the rear of the vehicle including one or more opened rear doors of the vehicle which cannot normally be seen by a driver when backing up even with rear view mirrors. The unit may be detachably supported or mounted at a bumper portion of the rear of the trailer by a support so that the video camera can generate a sequence of images from received light which is typically light reflected from pedestrians, obstacles or hazards at the rear of the trailer. The light may also be direct light provided by light sources carried by pedestrians or supported on objects at the rear of the trailer.

The first unit may include at least one battery to allow operation of the first unit after electrically disconnection of the first unit from the wiring harness of the vehicle. The unit may also include a battery-saving circuit coupled to a motion switch so that the unit is only energized by the batteries when the unit is moving and not at rest. The unit may also be energized by the power from the wiring harness when the first unit is properly mounted and connected to the wiring harness at the rear of the vehicle.

Referring still to FIG. 2, there is illustrated in block diagram schematic form, one embodiment of a real-time surveillance system for aiding drivers during vehicle operation such as vehicle backup. The system includes the image capture and transmitter first unit including the image sensor or video camera, which, as previously mentioned, generates a sequence of digital or analogue images from received light. The first unit also includes a motion detector or switch for detecting when the vehicle is in motion and for generating a corresponding signal. The motion detector or switch may be a gyroscope or an accelerometer. Alternatively, the motion detector may include a controller in the form of a microprocessor-based controller of the unit which is programmed to process or analyze the sequence of images generated by the camera to detect when the vehicle is in motion. For example, the size of a stationary object appearing in successive images can be compared to determine whether the distance from the unit to the subject is decreasing and, consequently, the vehicle is backing up.

The first unit may further include means or apparatus for authenticating a person desirous of using the system or removing the first unit from the vehicle as an authorized person based, at least in part, on an authenticator. The authenticator may include at least one of a password, a passphrase, a personal identification number, a security token, a security card, and a biometric identifier. The video camera may serve as at least part of the authenticator. Also, one or more sensors or input devices located about the camera on the unit may serve as part of the authenticator together with associated converters/drivers and with the microprocessor-based controller which is suitably programmed to act as the authenticator.

The biometric identifier may include at least one of a fingerprint, a retinal pattern, an infrared vein pattern, a signature, a voice, a face, a bio-electric signal, and a DNA sequence.

A receiver part of the transceiver of the first unit may be controlled by the first controller to receive and demodulate a plurality of satellite carrier signals from the satellites of FIG. 1 via an antenna to obtain satellite position and time data, and to process the position and time data to obtain geographic position data which represents position of the first unit. The transceiver may be controlled by the first controller to modulate a second carrier signal with the geographic position data and to transmit the modulated higher power, wide area second carrier signal over a wireless communication channel via the antenna when a person removing the first unit is unauthorized to remove the first unit as illustrated in FIG. 1. In that event the first unit may transmit the second carrier signal to towers such as cell phone towers or transmitters as also shown in FIG. 2 under battery power.

The first unit may include at least one warning device located about the camera selected from the group consisting of a proximity radar device, a Doppler radar device, a sonar device, an ultrasound device, an ultraviolet sensor, an infrared sensor, and a microwave sensor. Associated converters/drivers of the first unit are typically provided for such warning devices.

The first unit also preferably includes a transmitter/receiver (i.e. transceiver) controlled by the microprocessor-based controller through a system bus and an input/output (I/O) circuit to modulate a carrier signal with the images generated by the camera in response to vehicle-in-motion signal or on demand from the driver of the vehicle and to transmit the modulated signal over a wireless communication channel such as by the antenna.

The carrier signal may comprise a long range or short range RF signal generated via high power or low power, respectively, of the unit. However, the short range (i.e. local area), low power carrier signal may also be a WiFi or Bluetooth™ carrier signal, as is well known in the art of wireless communication.

The support at the rear of the trailer of FIG. 1 is provided to detachably support or mount the first unit (such as magnetically or mechanically (i.e. such as by clamping)) so that the video camera is capable of receiving light, either direct light or reflected light, from obstacles, such as pedestrians or hazards hidden from driver view in a region behind the vehicle. The support preferably supports the unit at a bumper location at the rear of the vehicle to disguise or conceal the camera from unauthorized individuals and to prevent damage to the camera from the environment. An optically transparent window may be provided on the unit to protect the camera while still allowing the light to enter the camera's lens system.

The system also includes a receiver/transmitter (i.e. transceiver) and display second unit, as shown in the lower portion of FIG. 2. The second unit receives and demodulates the carrier signal received by the second unit via its antenna to obtain the images previously generated by the video camera. The transceiver is under system control by a second microprocessor-based controller. The unit may include a speaker to provide an audio alarm and a screen display as illustrated in FIG. 2 or the display may be part of a rearview mirror assembly supported on the cab of the vehicle. In any event, the images are viewable by a driver of the vehicle in the backup mode in real-time. In addition or alternatively, the microprocessor-based second controller controls a smaller screen display to display the images for viewing by the driver when the second unit is located in the driver compartment of the cab. In this way, the images are viewable by the driver of the vehicle in the backup (or forward or on demand) mode of the vehicle in real-time.

Figure 3:
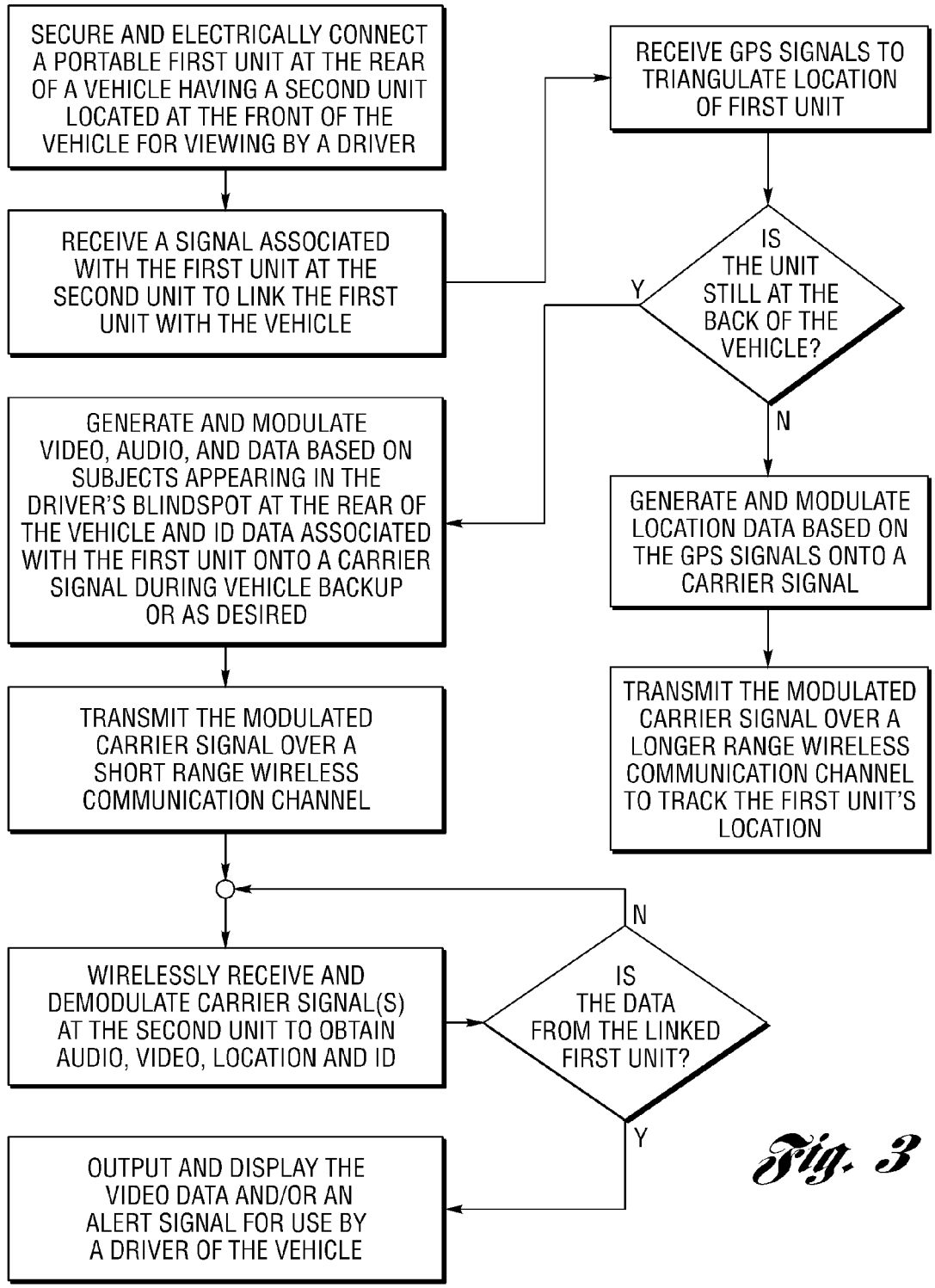
FIG. 3 is a block diagram flow chart illustrating various steps to use the embodiment of FIGS. 1 and 2.

Referring now to FIG. 3, there is illustrated in block diagram, flow chart form various steps that can be employed to use at least one embodiment of the system of the invention.

Initially, the portable, battery-powered image capture and transmitter first unit is removably and detachably mounted at the rear of a vehicle such as by a support at the rear of the trailer of FIG. 1. The cab or tractor of the vehicle, as illustrated in FIG. 1, may have hard-wired therein a receiver and display second unit or, alternatively, may removably and detachably support a portable, battery-operated receiver and display second unit in or on the cab so that the images from the rear of the vehicle are displayed on a screen of the unit which are viewable by a driver of the vehicle in the backup mode in real-time.

After (or before) the portable, image capture and transmitter first unit is secured, a signal having ID data associated with and uniquely identifying the first unit is wirelessly received at or manually programmed in the second unit to link the first unit with the second unit. Such ID data or data packet may be entered into the second unit manually (or through a user interface at the first or second units) or may be transmitted via a carrier signal over the wireless communication channel from the first unit. In this way, the second unit can later determine whether a subsequently received carrier signal was transmitted by the first unit rather than by some other RF transmitter located on some other vehicle. When the carrier signal is modulated with a set of identification data which uniquely identifies the first unit, the driver is assured that the display is displaying a scene of what is located at the rear of his or her vehicle.

Then the linked first unit is energized by electrical energy, either from the power at the wiring harness or from its battery upon the generation of a backup or forward signal from the motion switch or detector or on demand from the driver. The generated video or image data is modulated onto a carrier signal (based on a view at the rear of the vehicle) together with data generated from one or more warning devices and the ID data associated with the first unit during vehicle operation. Then the modulated carrier signal is transmitted typically over a short range wireless communication channel during the vehicle operation or on demand. The receiver and display second unit wirelessly receives and demodulates carrier signals to obtain the data and the ID data. From the ID data, the second unit determines whether the obtained video data is from the unit secured at the rear of the vehicle or from some other transmitter unit in the vicinity of the attached trailer. For example, multiple trailers having transmitter units may be located at and are transmitting wireless signals to a common parking location.

If the video data or images data from the warning devices are determined by the second controller to be from the linked first unit, the video data is output and displayed on the screen display of the second unit for view by the driver of the vehicle during vehicle operation. Also, an alert or warning signal (either video or audio) may be provided for use by a driver of the vehicle during backup at the second unit. The alert signal may be generated by the first or second controllers based on processed images which indicate an impending collision. If the video data is not from the linked first unit, then the video data (i.e., typically in the form of video images) is neither output nor displayed.

The transmitter of the first unit may be a transducer and the receiver of the second unit may be a transducer to establish two-way wireless communication between the first and second units. For example, the second unit may send one or more control signals to the first unit to control the operation of the camera of the first unit. A driver of the vehicle may wish to view the scene behind the vehicle prior to shifting into reverse or drive and even prior to starting the vehicle. By pressing a button or providing a command at a user interface of the second unit, a control signal is automatically transmitted to the first unit to start the transmission of video signals to the second unit for viewing by the driver.

Another example would be to have the second unit automatically wirelessly transmit a signal to the first unit indicating that the transmission of the vehicle is shifted into reverse or forward modes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A real-time surveillance system for aiding vehicle drivers, the system comprising:
   a portable first unit including:
      an image sensor that generates a sequence of images from received light;
      a first controller; and a transmitter controlled by the first controller to modulate a first carrier signal with the images and to transmit the modulated first carrier signal over a wireless communication channel;

a support to detachably support the first unit on the vehicle so that the image sensor is capable of receiving light from obstacles, hazards or individuals located in a blind spot region of the vehicle;

a second unit including:
  a second controller;
  a receiver to receive and demodulate the first carrier signal to obtain the images; and
  a display controlled by the second controller to display the images, the display being supported on the vehicle so that the images are viewable by a driver of the vehicle in real time; and means for authenticating a person desirous of using the system or removing the first unit from the vehicle as an authorized person based, at least in part, on an authenticator, wherein the authenticator includes at least one of a password, a passphrase, a personal identification number, a security token, a security card, and a biometric identifier.

2. The system as claimed in claim 1, wherein the biometric identifier includes at least one of a fingerprint, a retinal pattern, an infrared vein pattern, a signature, a voice, a face, a bio-electric signal, and a DNA sequence.

3. The system as claimed in claim 1, wherein the transmitter forms a part of the transceiver, a receiver part of the transceiver being controlled by the first controller to demodulate a plurality of satellite carrier signals to obtain satellite position and time data, and to process the position and time data to obtain geographic position data which represents position of the first unit, the transceiver being controlled by the first controller to modulate a second carrier signal with the geographic position data and to transmit the modulated second carrier signal over a wireless communication channel when a person removing the first unit is unauthorized to remove the first unit.

4. The system as claimed in claim 1, wherein the support detachably supports the first unit to a rear of the vehicle.

5. The system as claimed in claim 4, wherein the first unit includes means for electrically connecting the first unit with a wiring harness of the vehicle at the rear of the vehicle.

6. The system as claimed in claim 5, wherein the first unit includes at least one battery to allow operation of the first unit after electrically disconnecting the first unit from the wiring harness.

7. The system as claimed in claim 1, wherein the first unit includes at least one warning device selected from the group consisting of a proximity radar device, a Doppler radar device, a sonar device, an ultrasound device, an ultraviolet sensor, an infrared sensor, and a microwave sensor.

8. The system as claimed in claim 1, wherein the transmitter is controlled by the first controller to modulate the first carrier signal with a set of identification data, the set of identification data uniquely identifying the first unit, and wherein the receiver demodulates the carrier signal to obtain the set of identification data, the second controller determining whether the carrier signal was transmitted by the first unit based on the set of identification data.

9. The system as claimed in claim 1, wherein the image sensor is a video camera.

10. The system as claimed in claim 1, wherein the first controller is a microprocessor-based controller programmed to process the sequence of images to detect when the first unit is moving.

11. A real-time surveillance system for aiding drivers of vehicles having a cab and a trailer releasably connected to the cab, the system comprising:
  a portable first unit including:
    an image sensor that generates a sequence of images from received light;
    a first controller; and
    a transmitter controlled by the first controller to modulate a first carrier signal with the images and to transmit the modulated first carrier signal over a wireless communication channel;
  a support to detachably support the first unit at the rear of the trailer so that the image sensor is capable of receiving light from obstacles, hazards or individuals located in a blind spot region behind the vehicle;
  a second unit including:
    a second controller;
    a receiver to receive and demodulate the first carrier signal to obtain the images; and
    a display controlled by the second controller to display the images, the display being supported on the cab so that the images are viewable by a driver of the vehicle in real time; and
  means for authenticating a person desirous of using the system or removing the first unit from the vehicle as an authorized person based, at least in part, on an authenticator, wherein the authenticator includes at least one of a password, a passphrase, a personal identification number, a security token, a security card, and a biometric identifier.

12. The system as claimed in claim 11, wherein the biometric identifier includes at least one of a fingerprint, a retinal pattern, an infrared vein pattern, a signature, a voice, a face, a bio-electric signal, and a DNA sequence.

13. The system as claimed in claim 11, wherein the transmitter forms a part of transceiver, a receiver part of the transceiver being controlled by the first controller to demodulate a plurality of satellite carrier signals to obtain satellite position and time data, and to process the position and time data to obtain geographic position data which represents position of the first unit, the transceiver being controlled by the first controller to modulate a second carrier signal with the geographic position data and to transmit the modulated second carrier signal over a wireless communication channel when a person removing the first unit is unauthorized to remove the first unit.

14. The system as claimed in claim 11, wherein the first unit includes means for electrically connecting the first unit with a wiring harness of the trailer at the rear of the trailer.

15. The system as claimed in claim 14, wherein the first unit includes at least one battery to allow operation of the first unit after electrically disconnecting the first unit from the wiring harness.

16. The system as claimed in claim 11, wherein the first unit includes at least one warning device selected from the group consisting of a proximity radar device, a Doppler radar device, a sonar device, an ultrasound device, an ultraviolet sensor, an infrared sensor, and a microwave sensor.

17. The system as claimed in claim 11, wherein the transmitter is controlled by the first controller to modulate the first carrier signal with a set of identification data, the set of identification data uniquely identifying the first unit, and wherein the receiver demodulates the carrier signal to obtain the set of identification data, the second controller determining whether the carrier signal was transmitted by the first unit based on the set of identification data.

18. The system as claimed in claim 11, wherein the image sensor is a video camera.

19. The system as claimed in claim 11, wherein the first controller is a microprocessor-based controller programmed to process the sequence of images to detect when the first unit is moving.

\* \* \* \* \*